United States Patent
Xu et al.

(10) Patent No.: US 12,460,330 B2
(45) Date of Patent: *Nov. 4, 2025

(54) METHODS OF CREATING SOFT AND LOFTY NONWOVEN WEBS

(71) Applicant: The Procter & Gamble Company, Cincinnati, OH (US)

(72) Inventors: Han Xu, Cincinnati, OH (US); Gueltekin Erdem, Beijing (CN)

(73) Assignee: The Procter & Gamble Company, Cincinnati, OH (US)

( * ) Notice: Subject to any disclaimer, the term of this patent is extended or adjusted under 35 U.S.C. 154(b) by 246 days.

This patent is subject to a terminal disclaimer.

(21) Appl. No.: 18/449,737

(22) Filed: Aug. 15, 2023

(65) Prior Publication Data

US 2023/0383447 A1 Nov. 30, 2023

Related U.S. Application Data

(63) Continuation of application No. 17/830,416, filed on Jun. 2, 2022, now Pat. No. 11,767,622, which is a
(Continued)

(51) Int. Cl.
*D01D 5/084* (2006.01)
*D01D 5/088* (2006.01)
(Continued)

(52) U.S. Cl.
CPC .......... *D04H 1/544* (2013.01); *D01D 5/0985* (2013.01); *D01F 8/06* (2013.01); *D04H 1/4291* (2013.01);
(Continued)

(58) Field of Classification Search
CPC ........ B29C 2791/003; B29C 2791/006; D01D 5/08; D01D 5/084; D01D 5/088; D01D 7/00; D04H 3/005; D04H 3/16
(Continued)

(56) References Cited

U.S. PATENT DOCUMENTS

| 3,616,031 A | 10/1971 | Fleissner |
| 4,089,720 A | 5/1978 | Haley |

(Continued)

FOREIGN PATENT DOCUMENTS

| CA | 2378912 A1 | 2/2001 |
| CN | 1085972 A | 4/1994 |

(Continued)

OTHER PUBLICATIONS

PCT Search Report and Written Opinion for PCT/CN2018/118638 dated Sep. 2, 2019, 12 pages.
(Continued)

*Primary Examiner* — Leo B Tentoni
(74) *Attorney, Agent, or Firm* — Gregory P. Habiak; Christian M. Best

(57) ABSTRACT

A method of creating a soft and lofty continuous fiber nonwoven web is provided. The method includes providing molten polymer to a spinneret defining a plurality of orifices, and flowing a fluid intermediate the spinneret and a moving porous member. The moving porous member is positioned below the spinneret. The method includes using the fluid to draw or push the molten polymer, in a direction that is toward the moving porous member, through at least some of the plurality of orifices to form a plurality of individual continuous fiber strands. The method includes depositing the continuous fiber strands on the moving porous member at a first location to create an intermediate continuous fiber nonwoven web, and removing and/or diverting some of the fluid proximate to the first location to maintain loft and softness in the deposited intermediate continuous fiber nonwoven web.

18 Claims, 9 Drawing Sheets

Related U.S. Application Data continuation of application No. 16/695,248, filed on Nov. 26, 2019, now Pat. No. 11,396,720, which is a continuation of application No. PCT/CN2018/118638, filed on Nov. 30, 2018.

(51) Int. Cl.

| | | |
|---|---|---|
| *D01D 5/098* | (2006.01) | |
| *D01D 7/00* | (2006.01) | |
| *D01F 8/06* | (2006.01) | |
| *D04H 1/4291* | (2012.01) | |
| *D04H 1/4382* | (2012.01) | |
| *D04H 1/544* | (2012.01) | |
| *D04H 3/005* | (2012.01) | |
| *D04H 3/16* | (2006.01) | |

(52) U.S. Cl.
CPC ........... *D04H 1/4382* (2013.01); *D04H 3/163* (2013.01); *B29C 2791/003* (2013.01); *B29C 2791/006* (2013.01)

(58) Field of Classification Search
USPC ...... 264/101, 102, 103, 211.12, 211.14, 555; 156/167, 181
See application file for complete search history.

(56) References Cited

U.S. PATENT DOCUMENTS

| | | | |
|---|---|---|---|
| 4,097,965 A | 7/1978 | Gotchel et al. | |
| 4,107,364 A | 8/1978 | Sisson | |
| 4,940,502 A | 7/1990 | Marcus | |
| 5,302,220 A | 4/1994 | Terakawa et al. | |
| 5,382,400 A | 1/1995 | Pike et al. | |
| 5,522,810 A | 6/1996 | Allen, Jr. et al. | |
| 5,540,979 A | 7/1996 | Yahiaoui et al. | |
| 5,575,874 A | 11/1996 | Griesbach, III | |
| 5,599,420 A | 2/1997 | Yeo | |
| 5,622,772 A | 4/1997 | Stokes et al. | |
| 5,672,415 A | 9/1997 | Sawyer et al. | |
| 5,874,159 A | 2/1999 | Cruise et al. | |
| 6,066,221 A | 5/2000 | Marmon et al. | |
| 6,319,455 B1 | 11/2001 | Kauschke et al. | |
| 6,391,443 B1 | 5/2002 | Terada et al. | |
| 6,454,989 B1 | 9/2002 | Neely et al. | |
| 6,478,786 B1 | 11/2002 | Glaug et al. | |
| 6,491,933 B2 | 12/2002 | Lorenzi et al. | |
| 6,509,513 B2 | 1/2003 | Glaug et al. | |
| 6,528,439 B1 | 3/2003 | Stokes et al. | |
| H2062 H | 4/2003 | Blaney et al. | |
| 6,576,575 B2 | 6/2003 | Griesbach, III | |
| 6,588,080 B1 | 7/2003 | Neely et al. | |
| 6,589,892 B1 | 7/2003 | Smith et al. | |
| 6,592,697 B2 | 7/2003 | Pike et al. | |
| 6,592,960 B1 | 7/2003 | Suzuki et al. | |
| 6,613,704 B1 | 9/2003 | Arnold et al. | |
| 6,627,025 B1 | 9/2003 | Yu | |
| 6,642,429 B1 | 11/2003 | Carter et al. | |
| 6,686,303 B1 | 2/2004 | Haynes et al. | |
| 6,736,916 B2 | 5/2004 | Steinke et al. | |
| 6,740,792 B2 | 5/2004 | Waldroup et al. | |
| 6,777,056 B1 | 8/2004 | Boggs et al. | |
| 6,781,027 B2 | 8/2004 | Fenwick et al. | |
| 6,783,837 B1 | 8/2004 | Creagan et al. | |
| 6,797,360 B2 | 9/2004 | Varona | |
| 6,867,156 B1 | 3/2005 | White et al. | |
| 6,869,670 B2 | 3/2005 | Delucia et al. | |
| 6,877,246 B1 | 4/2005 | Hada et al. | |
| 6,878,650 B2 | 4/2005 | Clark et al. | |
| 6,887,423 B2 | 5/2005 | Van Trump et al. | |
| 6,911,174 B2 | 6/2005 | Creagan | |
| 6,946,506 B2 | 9/2005 | Bond | |
| 6,989,125 B2 | 1/2006 | Boney et al. | |
| 6,998,164 B2 | 2/2006 | Neely et al. | |
| 7,004,738 B2 | 2/2006 | Becker et al. | |
| 7,018,945 B2 | 3/2006 | Yahiaoui et al. | |
| 7,045,211 B2 | 5/2006 | Fairbanks et al. | |
| 7,056,891 B2 | 6/2006 | Resheski-wedepohl et al. | |
| 7,172,801 B2 | 2/2007 | Hoying et al. | |
| 7,179,247 B2 | 2/2007 | Mizutani et al. | |
| 7,196,026 B2 | 3/2007 | Di Luccio | |
| 7,247,215 B2 | 7/2007 | Schewe | |
| 7,291,239 B2 | 11/2007 | Polanco et al. | |
| 7,309,522 B2 | 12/2007 | Webb et al. | |
| 7,413,803 B2 | 8/2008 | Jordan et al. | |
| 7,425,517 B2 | 9/2008 | Deka et al. | |
| 7,651,653 B2 | 1/2010 | Morman et al. | |
| 7,674,058 B2 | 3/2010 | Berger et al. | |
| 7,922,849 B2 | 4/2011 | Sommer et al. | |
| 7,943,813 B2 | 5/2011 | Petryk et al. | |
| 7,989,062 B2 | 8/2011 | Chakravarty et al. | |
| 7,998,384 B2 | 8/2011 | Gillespie et al. | |
| 8,093,161 B2 | 1/2012 | Bansal | |
| 8,148,279 B2 | 4/2012 | Anantharamaiah et al. | |
| 8,236,385 B2 | 8/2012 | Yahiaoui et al. | |
| 8,240,484 B2 | 8/2012 | Fox et al. | |
| 8,314,286 B2 | 11/2012 | Drzewiecki et al. | |
| 8,410,005 B2 | 4/2013 | Brennan et al. | |
| 8,420,557 B2 | 4/2013 | Haberer et al. | |
| 8,426,671 B2 | 4/2013 | Steffen et al. | |
| 8,440,123 B2 | 5/2013 | Hanson et al. | |
| 8,440,286 B2 | 5/2013 | Curro et al. | |
| 8,518,311 B2 | 8/2013 | He et al. | |
| 8,569,569 B2 | 10/2013 | Zhang et al. | |
| 8,669,410 B2 | 3/2014 | Weismantel et al. | |
| 8,710,293 B2 | 4/2014 | Zhang et al. | |
| 8,721,827 B2 | 5/2014 | Chang et al. | |
| 8,895,800 B2 | 11/2014 | Weismantel et al. | |
| 8,906,815 B2 | 12/2014 | Moore et al. | |
| 8,932,704 B2 | 1/2015 | Porbeni et al. | |
| 9,029,277 B2 | 5/2015 | Ngai | |
| 9,073,040 B2 | 7/2015 | Dobrawa et al. | |
| 9,089,624 B2 | 7/2015 | Whitmore et al. | |
| 9,163,336 B2 | 10/2015 | He et al. | |
| 9,194,065 B2 | 11/2015 | Moore et al. | |
| 9,237,973 B2 | 1/2016 | Abuto et al. | |
| 9,259,059 B2 | 2/2016 | Horn et al. | |
| 9,416,485 B2 | 8/2016 | Moore et al. | |
| 9,480,968 B2 | 11/2016 | Weismantel et al. | |
| 9,539,357 B2 | 1/2017 | Ashraf et al. | |
| 9,540,746 B2 | 1/2017 | Ashraf et al. | |
| 11,236,448 B2 | 2/2022 | Brennan et al. | |
| 11,396,720 B2 | 7/2022 | Xu et al. | |
| 2001/0041876 A1 | 11/2001 | Creagan et al. | |
| 2002/0019206 A1 | 2/2002 | Deka et al. | |
| 2002/0090499 A1 | 7/2002 | Shelley et al. | |
| 2002/0177829 A1 | 11/2002 | Fell | |
| 2003/0027977 A1 | 2/2003 | Koning et al. | |
| 2003/0045192 A1 | 3/2003 | Midkiff et al. | |
| 2003/0056883 A1 | 3/2003 | Bansal et al. | |
| 2003/0068947 A1 | 4/2003 | Marmon et al. | |
| 2003/0082340 A1 | 5/2003 | Mccabe et al. | |
| 2003/0082977 A1 | 5/2003 | Kuroiwa et al. | |
| 2003/0087574 A1 | 5/2003 | Latimer et al. | |
| 2003/0104748 A1 | 6/2003 | Brown et al. | |
| 2003/0114066 A1 | 6/2003 | Clark et al. | |
| 2003/0116259 A1 | 6/2003 | Sayovitz et al. | |
| 2003/0118816 A1 | 6/2003 | Polanco et al. | |
| 2003/0203162 A1 | 10/2003 | Fenwick | |
| 2003/0213109 A1 | 11/2003 | Neely et al. | |
| 2004/0005457 A1 | 1/2004 | Delucia et al. | |
| 2004/0038612 A1 | 2/2004 | Forbes et al. | |
| 2004/0110442 A1 | 6/2004 | Rhim | |
| 2004/0116018 A1 | 6/2004 | Fenwick et al. | |
| 2004/0121680 A1 | 6/2004 | Yahiaoui et al. | |
| 2004/0122396 A1 | 6/2004 | Maldonado et al. | |
| 2004/0170836 A1 | 9/2004 | Bond | |
| 2004/0201125 A1 | 10/2004 | Allen et al. | |
| 2004/0224136 A1 | 11/2004 | Collier et al. | |
| 2004/0236297 A1 | 11/2004 | Drzewiecki et al. | |
| 2004/0254555 A1 | 12/2004 | Wang et al. | |
| 2005/0020170 A1 | 1/2005 | Deka et al. | |
| 2005/0077646 A1 | 4/2005 | Akiba et al. | |

(56) References Cited

U.S. PATENT DOCUMENTS

| | | |
|---|---|---|
| 2005/0079785 A1 | 4/2005 | Bond |
| 2005/0087288 A1 | 4/2005 | Haynes et al. |
| 2005/0095943 A1 | 5/2005 | Griffin et al. |
| 2005/0104261 A1 | 5/2005 | Allen et al. |
| 2005/0118916 A1 | 6/2005 | Ducker et al. |
| 2005/0136242 A1 | 6/2005 | Yahiaoui et al. |
| 2005/0136773 A1 | 6/2005 | Yahiaoui |
| 2005/0197027 A1 | 9/2005 | Crane et al. |
| 2005/0227563 A1 | 10/2005 | Bond |
| 2005/0244619 A1 | 11/2005 | Kauschke et al. |
| 2005/0245157 A1 | 11/2005 | Kepner et al. |
| 2005/0245158 A1 | 11/2005 | Yahiaoui et al. |
| 2005/0245162 A1 | 11/2005 | Ng et al. |
| 2005/0256476 A1 | 11/2005 | Mirle et al. |
| 2005/0260914 A1 | 11/2005 | Oathout |
| 2006/0004334 A1 | 1/2006 | Schlinz et al. |
| 2006/0027944 A1 | 2/2006 | Bentley et al. |
| 2006/0141217 A1 | 6/2006 | Ellis et al. |
| 2007/0026753 A1 | 2/2007 | Neely |
| 2007/0098768 A1 | 5/2007 | Close et al. |
| 2007/0141303 A1 | 6/2007 | Steindorf |
| 2008/0000057 A1 | 1/2008 | Nguyen |
| 2008/0003906 A1 | 1/2008 | Hill et al. |
| 2008/0038976 A1 | 2/2008 | Berrigan et al. |
| 2008/0086105 A1 | 4/2008 | Sour |
| 2008/0118727 A1 | 5/2008 | Andersen |
| 2008/0210363 A1 | 9/2008 | Sommer et al. |
| 2009/0076472 A1 | 3/2009 | Goldwasser et al. |
| 2009/0142595 A1 | 6/2009 | Matsui et al. |
| 2010/0159770 A1 | 6/2010 | Walser et al. |
| 2010/0174260 A1 | 7/2010 | Di Luccio et al. |
| 2010/0310845 A1 | 12/2010 | Bond et al. |
| 2010/0323575 A1 | 12/2010 | He et al. |
| 2011/0003524 A1 | 1/2011 | Claasen et al. |
| 2011/0076907 A1 | 3/2011 | Glew et al. |
| 2011/0123802 A1 | 5/2011 | Chang et al. |
| 2011/0144608 A1 | 6/2011 | Kim et al. |
| 2011/0179558 A1 | 7/2011 | Lyons |
| 2011/0250378 A1 | 10/2011 | Eaton |
| 2012/0004632 A1 | 1/2012 | Zhang et al. |
| 2012/0040185 A1 | 2/2012 | Topolkaraev et al. |
| 2013/0004552 A1 | 1/2013 | Pedoja |
| 2013/0023608 A1 | 1/2013 | Kellett et al. |
| 2013/0053479 A1 | 2/2013 | Bond et al. |
| 2013/0096526 A1 | 4/2013 | Schroeder et al. |
| 2013/0108831 A1 | 5/2013 | Wu et al. |
| 2013/0210308 A1 | 8/2013 | Mceneany et al. |
| 2013/0309932 A1 | 11/2013 | He et al. |
| 2014/0138584 A1 | 5/2014 | Bond et al. |
| 2014/0142225 A1 | 5/2014 | Bond et al. |
| 2014/0142226 A1 | 5/2014 | Bond et al. |
| 2014/0142232 A1 | 5/2014 | Bond et al. |
| 2014/0142233 A1 | 5/2014 | Layman et al. |
| 2014/0145374 A1 | 5/2014 | Altonen et al. |
| 2014/0272362 A1 | 9/2014 | Dugan et al. |
| 2014/0296388 A1 | 10/2014 | Bond et al. |
| 2014/0378922 A1 | 12/2014 | Fuchs et al. |
| 2015/0004866 A1 | 1/2015 | Scholz et al. |
| 2015/0017411 A1 | 1/2015 | Wilkie et al. |
| 2015/0137413 A1 | 5/2015 | Bond et al. |
| 2015/0173975 A1 | 6/2015 | Harumoto et al. |
| 2015/0211157 A1 | 7/2015 | Okuda et al. |
| 2015/0211158 A1 | 7/2015 | Hassan et al. |
| 2015/0322601 A1 | 11/2015 | Brown et al. |
| 2016/0040337 A1 | 2/2016 | Dutkiewicz et al. |
| 2016/0101208 A1 | 4/2016 | Topolkaraev et al. |
| 2016/0151213 A1 | 6/2016 | Bauduin et al. |
| 2016/0206772 A1 | 7/2016 | Schröder et al. |
| 2016/0206984 A1 | 7/2016 | Berrigan et al. |
| 2016/0222558 A1 | 8/2016 | Hofemeister et al. |
| 2016/0251788 A1 | 9/2016 | Huang et al. |
| 2016/0263271 A1 | 9/2016 | Huang et al. |
| 2017/0144405 A1 | 5/2017 | Liu et al. |
| 2017/0211216 A1 | 7/2017 | Brown et al. |
| 2017/0314163 A1 | 11/2017 | Sommer et al. |
| 2018/0002850 A1 | 1/2018 | Hansen et al. |
| 2018/0044826 A1 | 2/2018 | Maschino et al. |
| 2019/0316284 A1 | 10/2019 | Hansen et al. |
| 2020/0170853 A1 | 6/2020 | Brennan et al. |
| 2020/0173077 A1 | 6/2020 | Brennan et al. |
| 2020/0173078 A1 | 6/2020 | Xu |
| 2021/0146680 A1* | 5/2021 | Dollevoet .............. F26B 21/00 |
| 2021/0214870 A1 | 7/2021 | Cinquemani et al. |
| 2022/0098771 A1 | 3/2022 | Brennan et al. |
| 2022/0298687 A1 | 9/2022 | Xu et al. |
| 2023/0160117 A1 | 5/2023 | Xu |

FOREIGN PATENT DOCUMENTS

| | | |
|---|---|---|
| CN | 1131214 A | 9/1996 |
| CN | 1207667 A | 2/1999 |
| CN | 1207779 A | 2/1999 |
| CN | 1331766 A | 1/2002 |
| CN | 1582224 A | 2/2005 |
| CN | 1934296 A | 3/2007 |
| CN | 1993505 A | 7/2007 |
| CN | 201321535 Y | 10/2009 |
| CN | 101956295 A | 1/2011 |
| CN | 101990586 A | 3/2011 |
| CN | 102482819 A | 5/2012 |
| CN | 104711764 | 6/2015 |
| CN | 105463699 B | 4/2016 |
| CN | 106795670 A | 5/2017 |
| CN | 107227559 A | 10/2017 |
| CN | 107326541 A | 11/2017 |
| CN | 207175103 U | 4/2018 |
| CN | 108349222 A | 7/2018 |
| DE | 102011050328 B3 | 6/2012 |
| EP | 0665315 A1 | 8/1995 |
| JP | H07216710 A | 8/1995 |
| JP | H10280267 A | 10/1998 |
| JP | 2004511670 A | 4/2004 |
| JP | 2010156076 A | 7/2010 |
| WO | 9721863 A2 | 6/1997 |
| WO | 0112888 A1 | 2/2001 |
| WO | 0174281 A1 | 10/2001 |
| WO | 2005001188 A1 | 1/2005 |
| WO | 2008087193 A2 | 7/2008 |

OTHER PUBLICATIONS

PCT Suppl. Search Report and Written Opinion for PCT/CN2018/118638 dated Feb. 18, 2021, 10 pages.

All Office Actions; U.S. Appl. No. 16/695,248, filed on Nov. 26, 2019.

All Office Actions; U.S. Appl. No. 16/695,441; filed on Nov. 26, 2019.

All Office Actions; U.S. Appl. No. 17/830,416, filed on Jun. 2, 2022.

All Office Actions; U.S. Appl. No. 18/095,066, filed on Jan. 10, 2023.

Jin Xiangyu "Collection of Essays of Research on Nonwoven Technology", China Textile University, 1st volume, Feb. 1997, pp. 137-141.

* cited by examiner

METHODS OF CREATING SOFT AND LOFTY NONWOVEN WEBS

CROSS REFERENCE TO RELATED APPLICATION

This application is a continuation of, and claims priority under 35 U.S.C. § 120, to U.S. patent application Ser. No. 17/830,416, filed on Jun. 2, 2022, now granted U.S. Pat. No. 11,767,622, issued on Sep. 26, 2023, which is a continuation of U.S. patent application Ser. No. 16/695,248, filed on Nov. 26, 2019, now granted U.S. Pat. No. 11,396,720, issued on Jul. 26, 2022, which claims priority to Patent Application No. PCT/CN2018/118638, filed on Nov. 30, 2018, all of which are hereby fully incorporated by reference herein in their entirety.

FIELD

The present disclosure is generally directed to methods of creating soft and lofty fiber nonwoven webs, and is more particularly directed to, methods of creating soft and lofty continuous fiber nonwoven webs.

BACKGROUND

Nonwoven webs may comprise continuous fibers. The continuous fibers may be manufactured by a continuous fiber nonwoven manufacturing operation to form a continuous fiber nonwoven web. In such an operation, continuous fiber strands of molten polymer may be drawn or pushed downwardly from a spinneret by a fluid, such as air, toward a moving porous member, such as a moving porous belt. During the drawing or pushing, the continuous fiber strands may be quenched and stretched. The fluid (i.e., process air) flows toward the moving porous member. In some instances, vacuum may be applied under the moving porous member to aid in drawing the continuous fiber strands and the fluid toward the moving porous member. After the continuous fiber strands contact the moving porous member, the fluid may travel downstream with the newly formed web of continuous fiber strands and typically has to be removed by applying vacuum under the moving porous member. This vacuum reduces the loft of the continuous fiber strands on the moving porous member and inhibits the continuous fibers from crimping during cooling. Conventional spunbond processes also use a compaction roller proximate to a contact point between the continuous fiber strands and the moving porous member. The compaction roller reduces the loft on the newly formed web and inhibits fiber crimping. Conventional spunbond processes also use calendering to place bonds in the web, which substantially reduces the loft. Further, a hot air knife may be used in place of the compaction roller to pre-bond the web and fully seal a surface of the web. The hot air knife reduces cooling of the web, and thereby reduces crimping of the continuous fibers since crimping occurs during cooling. The hot air knife further reduces air permeability of the web, which is not desired. The fluid removal through the moving porous member, the compaction roller, the calendering, or the hot air knife may fully lock or bond the newly formed continuous fiber web and prevent, or at least inhibit, fibers from crimping on the moving porous member. This significantly reduces loft and softness of the newly formed web of continuous fibers and is not desired for some nonwoven applications, such as soft nonwovens for absorbent articles. As such, continuous fiber nonwoven manufacturing operations should be improved to create nonwoven webs with improved loft and softness, especially in the context of a continuous fiber nonwoven web that is through-fluid bonded.

SUMMARY

The present disclosure solves the problems of reduced loft, reduced softness, and reduced fiber crimping of the continuous fiber nonwoven webs. One important aspect is to allow the continuous fibers enough time, in a non-compacted or non-fully bonded state, on the moving porous member to remain lofty and have sufficient strength to be transported to subsequent process steps, such as another fiber laydown (i.e., an additional beam) or bonding. The present inventors have developed systems to reduce fiber compaction and surface sealing, thereby increasing loft and softness in a nonwoven web. As one example, the fluid (i.e., process air) may be removed or diverted from a first location to protect the web from stagnant air proximate to where the continuous fiber strands initially contact the moving porous member. This allows for reduced vacuum being applied through the moving porous member as the newly formed web travels downstream of the first location, thereby promoting increased loft, softness, and fiber crimping. If the fluid is removed (compared to merely being diverted) from proximate to the first location, it may be blown-off, or may be used in the pre-bonding step as discussed below. A compaction roller or a hot air knife may not be used to prevent, or at least inhibit, smashing (compaction roller) and fully sealing (hot air knife) of the continuous fibers. In some instances, a compaction roller applying a very light compaction force may be used while still achieving fiber crimping.

If a compaction roller is not used, or even if a very light compaction roller is used, one issue that may arise is fiber blow-back on the moving porous member. That is, fibers falling back on themselves (in a direction opposite a machine direction) because the fibers are not bonded together to form a web with suitable integrity for processing. The present inventors propose a few solutions to fiber blow-back that may or may not be used in combination. First, the continuous fiber strands on the moving porous member may be pre-bonded with a hot fluid, such as hot air, infrared technology, or other technology, in less than 100%, less than 75%, less than 50%, less than 25%, or less than 10%, for example, of a side of the continuous fiber web. The pre-bonding occurs on the side of the continuous fiber web facing away from the moving porous member. The hot fluid may be at least some of the same fluid removed proximate to the first location, but that has been heated. In other instances, the hot fluid may be separately supplied to the process. In any event, the hot fluid may be used to pre-bond the continuous fiber web on the moving porous member downstream of the first location. This hot fluid may be at a much lower pressure compared to the pressure applied by a compaction roller, thereby leading to less compaction of the unbonded web. Some examples of pre-bonding using the hot fluid may use a perforated drum (that may or may not also remove the hot process fluid) or a perforated plate. Using a perforated member will allow pre-bonding to occur in less than 100% of the surface of the continuous fiber web, thereby allowing better air permeability, less compaction between pre-bonded areas, and allowing the fibers to still crimp on the moving porous member. The perforated member also allows pre-bonding to occur intermittently in the machine direction and/or the cross machine direction. Second, a fluid diverter may be used above the moving porous member to at least inhibit stagnant air from contacting the web. The web may be placed in between the moving porous member and the fluid diverter to prevent, or at least inhibit, fiber blow back. The web may be in contact with both the fluid diverter and the moving porous member therefore having increased shear force to enable transportation under a lower web strain. As crimping may still continue, the machine direction strain of the web may be reduced to a negative number or a very low web strain, thereby allowing the fibers to curl to promote better loft. The fluid diverter may be an elongated plate or an elongated conveyor belt, for example. The fluid diverter may act to shield the web from stagnant process air. Third, water steam or other liquid may be sprayed on the web proximate to, but downstream of, the first location to reduce fiber blow-back. The water or other liquid will still allow the fibers to crimp, but will allow them to be conveyed on the moving porous member at speed with reduced fiber blow-back. Further, the water or other liquid will be evaporated in a through-fluid bonding process downstream of the water or other liquid application point.

BRIEF DESCRIPTION OF THE DRAWINGS

The above-mentioned and other features and advantages of the present disclosure, and the manner of attaining them, will become more apparent and the disclosure itself will be better understood by reference to the following description of example forms of the disclosure taken in conjunction with the accompanying drawings, wherein.

DETAILED DESCRIPTION

Figure 1:
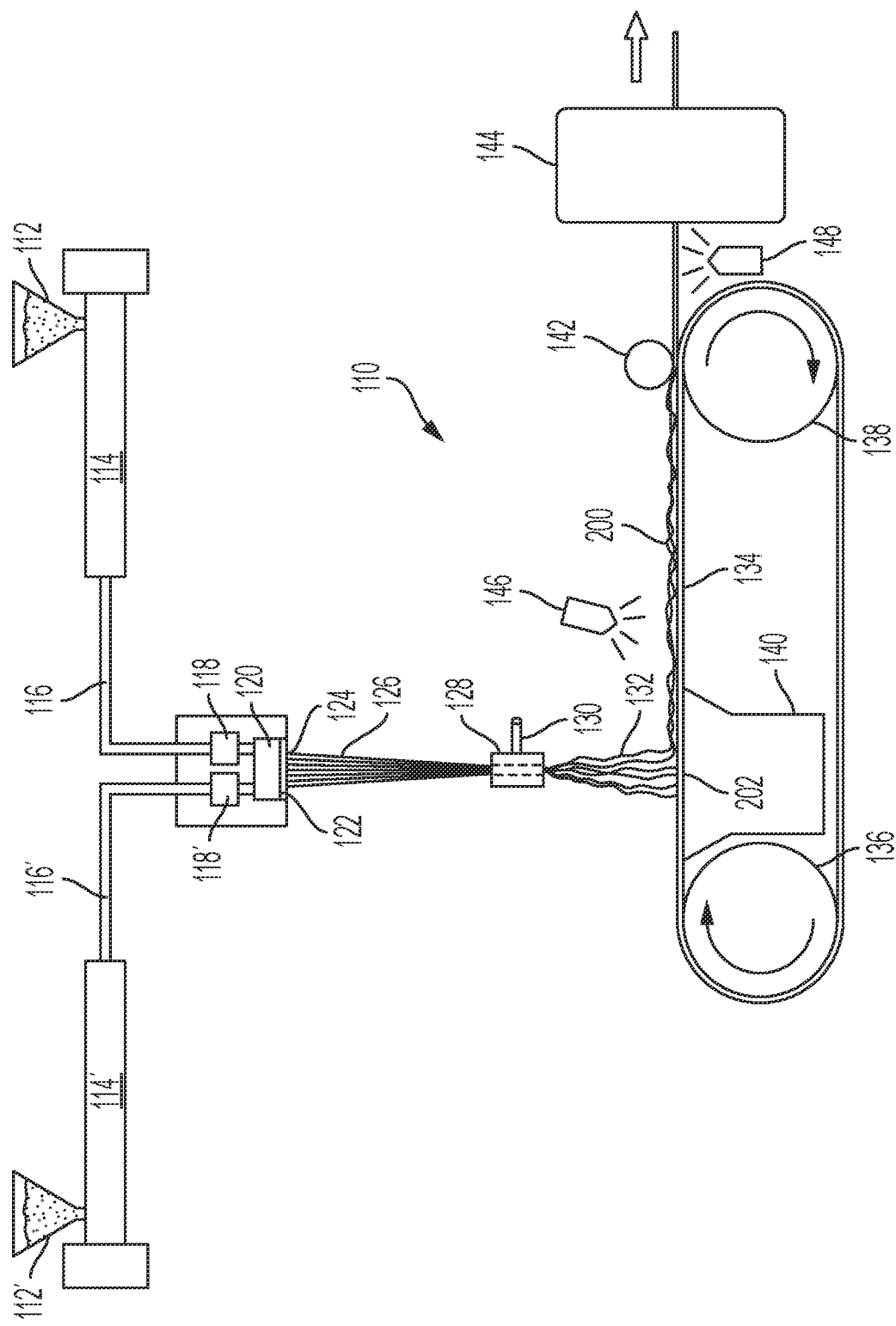
FIG. 1 is a diagrammatic view of an apparatus for performing a process for forming a through-fluid bonded continuous fiber nonwoven web including pre-bonding and reorienting and/or relofting of the continuous fibers.

Various non-limiting forms of the present disclosure will now be described to provide an overall understanding of the principles of the structure, function, manufacture, and use of the methods of soft and lofty nonwoven webs disclosed herein. One or more examples of these non-limiting forms are illustrated in the accompanying drawings. Those of ordinary skill in the art will understand that the methods of creating soft and lofty nonwoven webs described herein and illustrated in the accompanying drawings are non-limiting example forms and that the scope of the various non-limiting forms of the present disclosure are defined solely by the claims. The features illustrated or described in connection with one non-limiting form may be combined with the features of other non-limiting forms. Such modifications and variations are intended to be included within the scope of the present disclosure.

Nonwoven Webs

Nonwoven webs are useful in many industries, such as the hygiene industry, the dusting and cleaning implement industry, and the healthcare industry, for example. In the hygiene industry, nonwoven webs are used in the absorbent article field, such as use as components in diapers, pants, adult incontinence products, tampons, sanitary napkins, absorbent pads, bed pads, wipes, and various other products. Nonwoven webs may be used in diapers, pants, adult incontinence products, and/or sanitary napkins, for example, as topsheets, outer cover nonwoven materials, portions of leg cuffs, acquisition materials, core wrap materials, portions of ears and side panels, portions of fastener tabs, and/or secondary topsheets, for example. The nonwoven webs of the present disclosure are not limited to any certain industry or application, but can have application across many industries or applications.

Fiber Composition

The fibers of the nonwoven webs of the present disclosure may comprise multi-constituent fibers, such as bicomponent fibers or tri-component fibers, for example, mono-component fibers, and/or other fiber types. Multi-constituent fibers, as used herein, means fibers comprising more than one chemical species or material (i.e., multi-component fibers). Bicomponent fibers are used in the present disclosure merely as an example of multi-constituent fibers. The fibers may have round, triangular, tri-lobal, or otherwise shaped cross-sections, for example. It may be desirable to have fibers comprising more than one polymer component, such as bicomponent fibers. Often, these two polymer components have different melting temperatures, viscosities, glass transition temperatures, and/or crystallization rates. As the multi-component fibers cool after formation, a first polymer component may solidify and/or shrink at a faster rate than a second polymer component while the second polymer component may have sufficient rigidity to resist compression along a longitudinal fiber axis. The continuous fibers may then deform and curl up when strain on the fiber is relieved, and thereby causing what is known as "crimp" in the fibers. Crimp of the fibers aids in the softness and loft of a nonwoven web, which is consumer desirable. Examples of bicomponent fibers may comprise a first polymer component having a first melting temperature and a second polymer component having a second melting temperature. The first melting temperature of the first polymer component may be about 5 degrees C. to about 180 degrees C., about 10 degrees C. to about 180 degrees C., or about 30 degrees C. to about 150 degrees C., different than the second melting temperature of the second polymer component, thereby causing crimping of the fibers during cooling, specifically reciting all 0.1 degree C. increments within the specified ranges and all ranges formed therein or thereby. The first and second melting temperatures may differ by at least 5 degrees, at least 10 degrees C., at least 20 degrees, at least 25 degrees, at least degrees C., at least 50 degrees C., at least 75 degrees C., at least 100 degrees C., at least 125 degrees C., at least 150 degrees C., but all less than 180 degrees C., for example. As a further example, a first polymer component may comprise polypropylene and a second polymer component may comprise polyethylene. As yet another example, a first polymer component may comprise polyethylene and a second polymer component may comprise polyethylene terephthalate. As yet another example, a first polymer component may comprise polyethylene and a second polymer component may comprise polylactic acid. If tri-component fibers are used, at least one polymer component may have a different melting temperature (in the ranges specified above) than a melting temperature of at least one of the other two polymer components. The fibers may comprise petroleum sourced resins, recycled resins, and/or or bio-sourced resins, such as polylactic acid from Nature Works and polyethylene from Braskem. The fibers may be or may comprise continuous fibers, such as spunbond fibers and melt-blown fibers. Carded staple fibers, either petroleum-sourced or bio-sourced, such as cotton, cellulous, and/or regenerated cellulous may also be included into the web and therefore are within the scope of the methods of the present disclosure. The multi-constituent fibers, such as bicomponent fibers, may comprise sheath/core, side-by-side, islands in the sea, and/or eccentric configurations or may have other configurations.

Using thinner fibers may help through-fluid bonding intermediate continuous fiber nonwoven webs to create softer continuous fiber nonwoven webs. For example, the continuous fibers may have a decitex in the range of about 0.5 to about 5, about 0.8 to about 4, about 0.8 to about 3, about 0.8 to about 2, about 0.8 to about 1.5, about 1 to about 1.4, about 1.1 to about 1.3, or about 1.2, specifically reciting all 0.1 decitex increments within the specified ranges and all ranges formed therein or thereby.

General Continuous Fiber Nonwoven Formation Process

Many nonwoven webs are made from melt-spinnable polymers and are produced using a spunbond process. The term "spunbond" refers to a process of forming a nonwoven web from thin continuous fibers produced by extruding molten polymers from orifices of a spinneret. The continuous fibers are drawn as they cool. Quenching of the continuous fibers may be performed by blowing air onto the continuous fibers from one side or multiple sides under the spinneret in one or more open or enclosed chambers. Quench air temperate, flow rate, and humidity may be controlled in one or more stages located along the continuous fibers. Continuous fiber speed may be in range from about 1000 m/min to about 8000 m/min, for example, depending on the polymers selected. Air is the most common method of fiber attenuation in systems, such as mostly enclosed chambers developed by Reifenhauser GmbH, or by aspirators developed by Hills Inc., or inside Doncan systems developed by Lurgi GmbH. Mechanical methods, such as take-up rollers, or electrostatic methods may also be used for continuous fiber attenuation. After attenuation, the continuous fibers are randomly laid on a moving porous member, such as a moving porous belt, such that the continuous fibers form an intermediate continuous fiber nonwoven web. The intermediate continuous fiber nonwoven web is subsequently bonded using one of several known techniques, such as thermal point bonding or through-fluid bonding, for example, to form the nonwoven web. Spunbonding processes, however, result in low loft and softness in produced nonwoven webs due to the heavy thermal point bonding and reduced ability for the fibers to crimp on the moving porous member.

FIG. 1 diagrammatically illustrates an example apparatus 110 for producing continuous fiber nonwoven webs. The apparatus 110 may comprise a hopper 112 into which pellets of a solid polymer may be placed. The polymer may be fed from the hopper 112 to a screw extruder 114 that melts the polymer pellets. The molten polymer may flow through a heated pipe 116 to a metering pump 118 that in turn feeds the polymer stream to a suitable spin pack 120. The spin pack 120 may comprise a spinneret 122 defining a plurality of orifices 124 that shape the fibers extruded therethrough. The orifices may be any suitable shape, such as round, for example. If bi-component fibers are desired, another hopper 112', another screw extruder 114', another heated pipe 116', and another metering pump 118' may be included to feed a second polymer to the spinneret 122. The second polymer may be the same as or different than the first polymer. In some instances, the second polymer may be a different material and may have a different melting temperature as the first polymer as discussed herein. This difference in melting temperature allows formed bi-component fibers to crimp on the moving porous member as discussed herein. More than two polymer feed systems may also be included if 3 or more polymer components are desired.

Referring again to FIG. 1, an array of continuous fiber strands 126 may exit the spinneret 122 of the spin pack 120 and may be pulled downward by a drawing unit or aspirator 128, which may be fed by a fluid such as compressed air or steam from a conduit or other fluid source 130. Specifically, the aspirator 128 uses fluid pressure or air pressure to form a fluid flow or air flow directed generally downward toward the moving porous member, which creates a downward fluid drag or air drag on the continuous fibers, thereby increasing the velocity of the portion of the continuous fiber strands in and below the aspirator relative to the velocity of the portion of the continuous fibers above the aspirator. The downward drawing of the continuous fibers longitudinally stretches and transversely attenuates the continuous fiber strands. The aspirator 128 may be, for example, of the gun type or of the slot type, extending across the full width of the continuous fiber array, i.e., in the direction corresponding to a width of the intermediate nonwoven web to be formed by the continuous fibers. The area between the spinneret 122 and the aspirator 128 may be open to ambient air (open system) as illustrated or closed to ambient air (closed system).

The aspirator 128 delivers the attenuated continuous fibers 132 onto a moving porous member 134, such as a screen-type forming belt, which may be supported and driven by rolls 136 and 138 or other mechanisms. A suction box 140 may provide a negative fluid pressure to the moving porous member 134 and the intermediate continuous fiber nonwoven web on the moving porous member 134. For example, the suction box 140 may be connected to a fan to pull room air (at the ambient temperature) through the moving porous member 134, causing the continuous fibers 132 to form an intermediate continuous fiber nonwoven web 200 on the moving porous member 134. The intermediate continuous fiber web 200 may pass through an optional compaction roll 142 that applies a very light pressure (e.g., about 10 to about 60 psi, or less than 120 psi). In other instances, no compaction roll is used. The intermediate continuous fiber nonwoven web 200 may then be conveyed on the moving porous member 134 or other conveyer or belt into a through-fluid bonding oven 144.

The through-fluid bonding oven 144 may take on various configurations, such as flat, omega shaped, stacked, single belt, or multiple belts, for example. More than one though-fluid bonding oven may be used. One example configuration is to have a hot fluid supply, such as hot air, above the web 200 and a hot fluid vacuum below the web 200. Of course, this configuration could be reversed to provide loft to the web in a direction opposite to the vacuum forces applied during continuous fiber laydown. The hot fluid may be recycled in the through-fluid bonding oven 144. The hot fluid may travel through the through-fluid bonding oven 144 at a flow rate in the range of about 0.5 m/s to about 5 m/s and at a temperature in the range of about 10 degrees C. to about 280 degrees C., for example. In some instances, it may be desirable to also have cooling within the through-fluid oven to set the fiber to fiber bonding.

If calendar bonding is not used, the intermediate continuous fiber nonwoven webs 200 may have a tendency to blow-back in a direction opposite a direction of movement of the moving porous member 134. This fiber blow-back is not desired because it may create high basis weight areas and low basis weight areas or even holes in the intermediate nonwoven web 200. As such, it may be desirable to pre-bond (as in bond before through-fluid bonding) the intermediate nonwoven web 200 at a location proximate to the suction box 140. The pre-bonding may provide the web with some structural integrity. The pre-bonding may be achieved by introducing a hot fluid, such as a hot air, infrared technology, or other technology, to the intermediate nonwoven web 200. As an example, the pre-bonding may occur via a short through-fluid bonding oven. As another example, the hot fluid may be provided by a fluid source 146 positioned over the moving porous member and proximate to the suction box 136. The fluid source 146 may be a perforated plate or multiple fluid sources, for example, so that less than 100%, less than 75%, less than 50%, less than 25%, but greater than 10% of a surface of the intermediate nonwoven web 200 not facing the moving porous member 134 receives pre-bonds. The pre-bonds may be intermittent in the cross-direction and/or the machine direction. It may be desirable to pre-bond less than 100% or less of the surface of the intermediate nonwoven web 200 so that the surface is not sealed and the continuous fibers of the webs are still allowed to further entangle with each other. The pre-bonds, however, do help in preventing, or at least inhibiting, fiber blow-back and providing the web 200 with some structural integrity.

In addition to pre-bonding, the intermediate nonwoven web 200 may be reentangled and/or reoriented prior to entering the through-fluid bonding oven 144. Reentangling and/or reorienting may occur by flowing a fluid, such as air, from a fluid source 148 from under the moving porous member 134 and into the intermediate nonwoven web 200. Reentangling and/or reorienting the continuous fibers prior to through-fluid bonding may help with loft, softness, and fiber entanglement of the intermediate nonwoven web 200.

The present disclosure provides methods for producing soft and lofty through-fluid bonded continuous fiber nonwoven webs compared to typical spunbond processes or even typical continuous fiber nonwoven web through-fluid bonded processes. As discussed herein, some factors to consider in producing soft and lofty continuous fiber webs are: (1) allowing the continuous fibers to crimp once on a moving porous member or belt; (2) inhibiting fiber blow-back on the moving porous member; (3) conveying the web on the moving porous member under reduced vacuum forces; and (4) conveying the web on the moving porous member at a reduced machine directional strain, for example. The present disclosure provides one or more methods of achieving these factors. It will be understood that some of the methods, or portions thereof, may be used with other of the methods, or portions thereof, to further optimize the webs. For example, more than one process air diverter and/or remover may be used with another process air diverter and/or remover.

Figure 2:
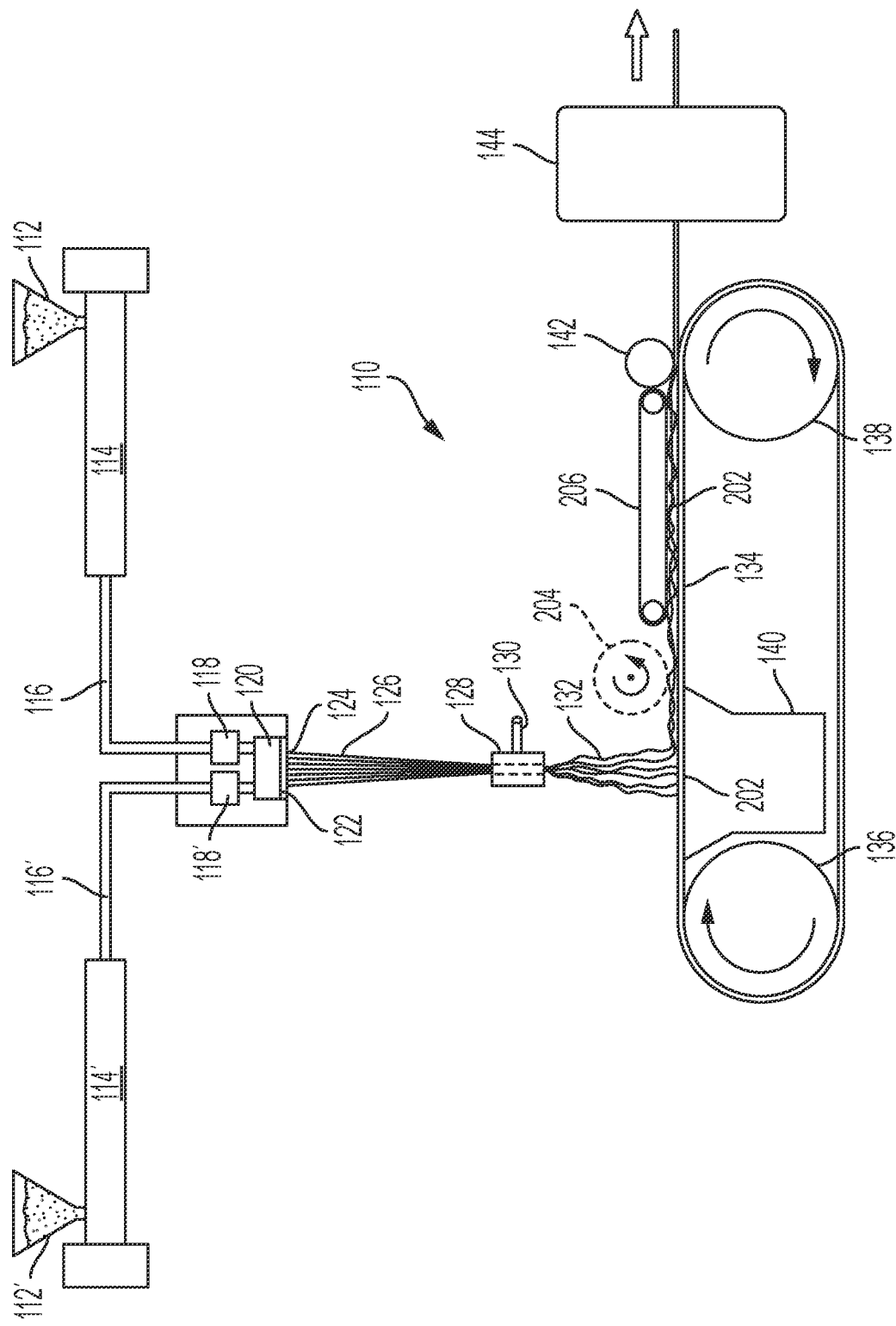
FIG. 2 is a diagrammatic view of an apparatus for performing a process for forming a through-fluid bonded continuous fiber nonwoven web illustrating a fluid handing roll and an elongated fluid diversion element.

Referring to FIG. 2, the process illustration of FIG. 1 is shown with process fluid handling, such as process fluid removal and/or diversion. The basic continuous fiber making process, other than the process fluid removal and/or diversion, may be generally the same as explained herein relative to FIG. 1, including pre-bonding and fiber reentangling and/or reorienting, although not illustrated in FIG. 2. The continuous fibers 132 meet the moving porous member 134 at a first location 202 and are then conveyed downstream of the first location 202 toward the through-fluid bonding oven 144. It is noted that any of the "moving porous members" disclosed herein may have sections or portions that are not porous, but at least some sections or portions of the moving porous members are able to have a fluid flow therethrough. These continuous fibers travel from the spinneret 122 in a process fluid, some of which travels with the intermediate continuous fiber web 200, downstream of the first location 202 and some of which is removed by the suction box 140. It may be desirable to remove and/or divert at least some of the process fluid (e.g., air) that travels with the intermediate continuous fiber web 200 downstream of the first location 202. As such, a fluid remover or diverter may be useful especially in an absence of a compaction roll to reduce process fluids from interacting with stagnant fluids, thereby at least partially ruining web uniformity. Typically, the removal of the downstream process fluid has been accomplished by having vacuum under the moving porous member 200 downstream of the first location which in turn draws the web 200 toward the moving porous member and reduces fiber crimping and web loft and softness. Instead of such removal, or at least the same degree of removal, the present inventors have invented more improved ways of removing and/or diverting process fluid while allowing the continuous fibers to crimp on the moving porous member to achieve improved softness and loft.

Referring again to FIG. 2, a fluid handling roll 204 is provided proximate to, but downstream of, the first location 202. The fluid handling roll 204 may rotate in the direction shown by the arrow and may remove and blow-off fluid in different zones in a direction away from the deposited intermediate continuous fiber nonwoven web to maintain loft and softness in the deposited intermediate continuous fiber nonwoven web. At times, the blown-off fluid may be used to pre-bond the intermediate continuous fiber nonwoven web as discussed further herein. In such an instances, the blown-off fluid may require heating. An elongated fluid diversion element 206 or an elongated fluid shield may be positioned over a portion of the moving porous member 134. The elongated fluid diversion element 206 may divert at least some process fluid from contact with the web 200 as the web 200 moves downstream toward the through-fluid bonding oven 144. This may reduce fiber blow-back. At times, the elongated fluid diversion element 206 may actually contact a surface of the web in facing contact to itself, such that the web may be at least partially transported in the machine direction using shear forces between the moving porous member 134 and the elongated fluid diversion element 206. This allows reduction of machine direction strain on the web 200, which also allows the web to further crimp and remain lofty as it is being conveyed toward the through-fluid bonding oven 144. The machine direction strain of the web intermediate the moving porous member 134 and the elongated fluid diversion element 206 may be in the range of about −15% to about 5%, about −10% to about 5%, about −5% to about 5%, about −2% to about 5%, about −2% to about 3%, about −2% to about 1.8%, about −2% to about 1.5%, or about −2% to about 0.5%, for example. Machine direction strain may be defined as the ((present length of the web minus original length of the web at entry of the device where the web transport is assisted by shear, such as the fluid diversion element 204)/original length of the web)×100%.

The elongated fluid diversion element 206 also allows for vacuum in the suction box 140 and/or intermediate the suction box 140 and the through-fluid bonding oven 144 to be reduced or even eliminated. This also promotes crimping of the fibers of the web 200. The elongated fluid diversion element 206 may be adjustable in angle with respect to a machine direction of the web 200 or in a distance away from the moving porous member.

The elongated fluid diversion element 206 may be an elongated conveyor or an elongated plate. The elongated fluid diversion element 206 may be generally fluid impermeable, but may have sections that are fluid permeable. In the instance that it is desired that the elongated fluid diversion element 206 contacts the web 200, the elongated conveyor or an elongated belt may be more suitable than the elongated plate. The elongated conveyor or belt may move in the same direction as the moving porous member or a different or opposite direction as the moving porous member, depending on the desired result. In any event, the elongated fluid diversion element 206 may extend from the first location 202 to the through-fluid bonding oven 144 or any distance therebetween. In some instances, it may be desirable to have more than one elongated fluid diversion element 206, such as two or three, for example. In such an instance, the continuous fibers of the web 200 may be reoriented and/or relofted intermediate the multiple elongated fluid diversion elements 206. The elongated fluid diversion element 206 may be spaced a distance in the range of about 0.5 mm to about 20 mm, about 0.5 mm to about 15 mm, or about 1 mm to about from the moving porous member 134, specifically reciting all 0.1 mm increments within the specified ranges and all ranges formed therein or thereby. This distance may be adjustable for different webs being produced. The elongated fluid diversion element 206 may extend the full width of the intermediate continuous fiber nonwoven web 200, may extend greater than the full width of the web 200, or may extend less than the full width of the web 200. In some instances, more than one elongated fluid diversion element may be used in the cross machine direction and/or in the machine direction. A heated fluid, such as heated air, may be passed through the elongated fluid diversion element 206 for pre-bonding of the web 200.

Figure 3:
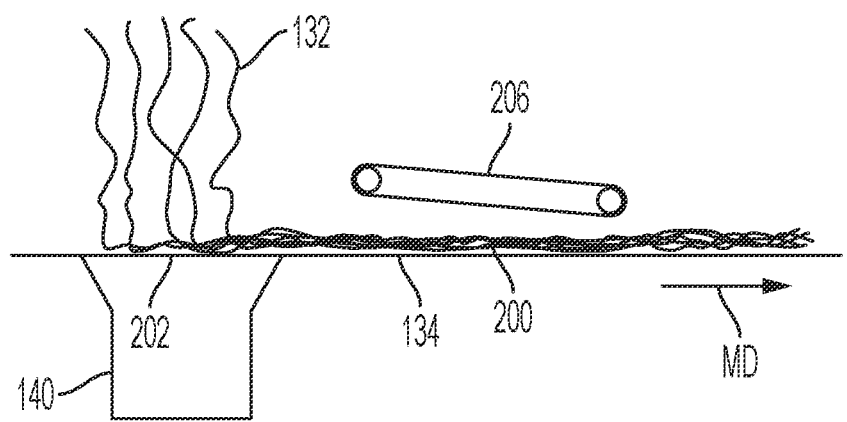
FIG. 3 is a plan view of a portion of a process illustration of FIG. 2 showing an example elongated fluid diversion element positioned over the moving porous member.
Figure 4:
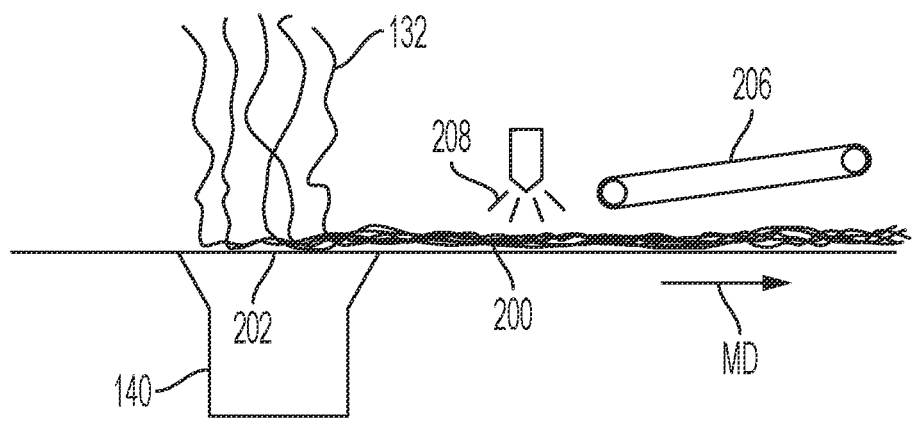
FIG. 4 is a plan view of a portion of the process illustration of FIG. 2 showing another example elongated fluid diversion element positioned over the moving porous member and with a liquid being applied to the intermediate continuous fiber nonwoven web.
Figure 5:
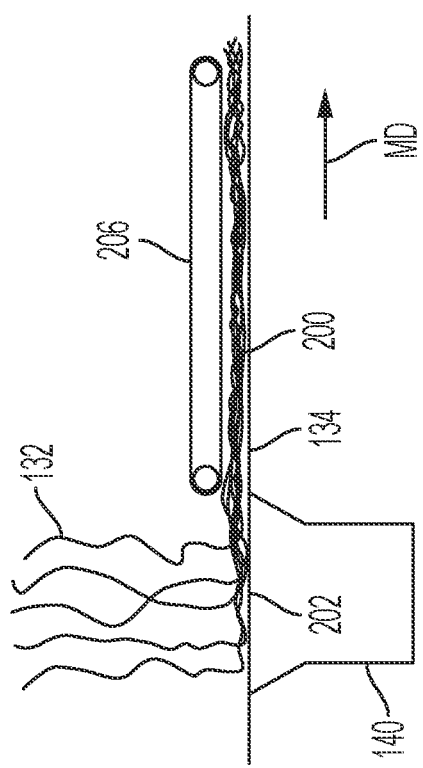
FIG. 5 is a plan view of a portion of a process illustration showing an example elongated fluid diversion element positioned over the moving porous member.

Referring to FIGS. 2-4, the elongated fluid diversion element 206 may be angled with respect to the moving porous member to reduce turbulence and ensure smooth entry of the web 200 under the fluid diversion element 206. The elongated fluid diversion element 206 may be angled in the range of about 40 degrees to about −40 degrees, about −30 degrees to about 30 degrees, about −25 degrees to about 25 degrees, about −20 degrees to about 20 degrees, about −15 degrees to about 15 degrees, about −10 degrees to about 10 degrees, about −5 degrees to about 5 degrees, about −3 degrees to about 3 degrees, about −2 degrees to about 2 degrees, about −1 degree to about 1 degree, or about −0.5 degrees to about 0.5 degrees, relative to a machine direction of the moving porous member 134, specifically reciting all 0.1 degree increments within the specified ranges and all ranges formed therein or thereby. FIG. 3 shows an elongated fluid diversion element 206 that is an elongated conveyor and that has a negative angle relative to the machine direction (MD) of the moving porous member 134. FIG. 4 shows an elongated fluid diversion element 206 that is an elongated conveyor and that has a positive angle relative to the machine direction (MD) of the moving porous member 134. FIG. 5 illustrates an elongated fluid diversion element 206 that is an elongated plate and that is not angled with respect to the machine direction (MD) of the moving porous member 134. The elongated plate may be angled as discussed above. Further, the elongated conveyor may or may not be angled. The elongated fluid diversion element 206 may be used in conjunction with the fluid handling roll 204, or process fluid remover/diverter (discussed below) or may be used without the fluid handling roll 204 or the process fluid remover/diverter.

The elongated fluid diversion element 206 may be placed at a distance in the range of about 0.1 meters to about 3 meters, or about 0.1 meters to about 2 meters, for example, downstream in the machine direction from a center of an impingement point (i.e., center of continuous fiber strands contacting the moving porous member 134 in the first location 202). Such distance may depend on a machine direction width of the spinneret, but it may be desirable to place the elongated fluid diversion element 206 as close to the fiber laydown stream (or first location) as possible without creating disturbance of the fiber laydown.

Referring again to FIG. 4, a liquid and/or a moisturized fluid 208, such as water or steam may be sprayed or applied to the intermediate continuous fiber nonwoven web 200 proximate to the first location 202 or downstream of the first location 202. The liquid and/or moisturized fluid 208 may be used to reduce fiber blow-back of the continuous fibers. This application of the liquid and/or moisturized fluid 2088 may be used in conjunction with the fluid handling roll 204, the elongated fluid diversion element 206, the process fluid remover/diverter, and/or other process fluid control equipment and methods of the present disclosure. The liquid and/or moisturized fluid 208 may also be used in conjunction with pre-bonding the web or may be used instead of pre-bonding the web. The liquid and/or moisturized fluid 208, especially water or steam, will evaporate from the intermediate continuous fiber nonwoven web 200 when the web is conveyed through the through-fluid bonding oven 144.

Figure 6:
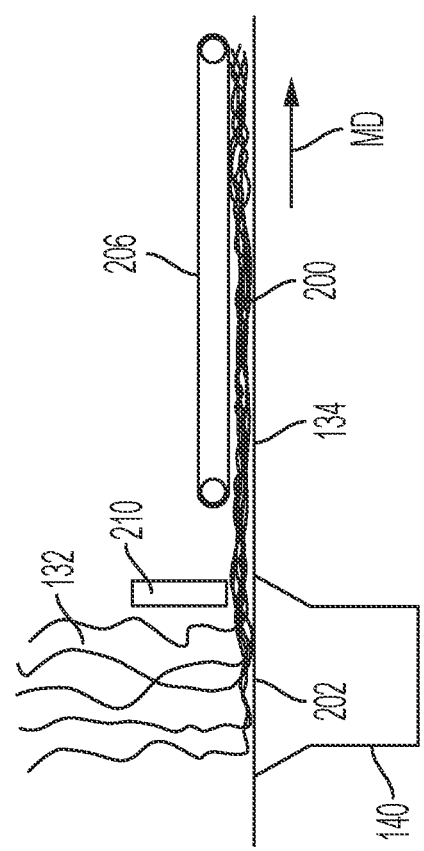
FIG. 6 is a plan view of a portion of a process illustration showing a process fluid remover/diverter and an elongated fluid diversion element.

Referring to FIG. 6, a process fluid remover/diverter 210 may be positioned proximate to the first location 202 or downstream of the first location. The process fluid remover/diverter 210 may be a plate, for example. The process fluid remover/diverter 210 may be used to prevent, or at least inhibit, process fluids from traveling downstream with the web 200, thereby reducing the need for a significant amount vacuum downstream to remove such process fluids. The process fluid remover/diverter 210 may be positioned proximate to an upper surface of the web 200 and extend upwardly a suitable distance, such as 10 or 12 inches, for example. The process fluid remover/diverter 210 may extend fully across a width of the web or less than or greater than a width of the web. The process fluid remover/diverter 210 may optionally be used in combination with an elongated fluid diversion element 206, such as an elongated conveyor, for example.

Figure 7:
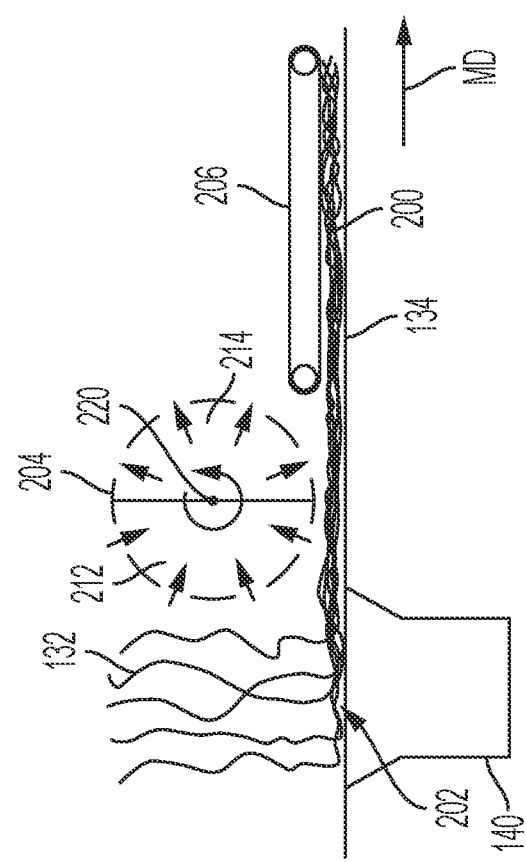
FIG. 7 is a plan view of a portion of the process illustration of FIG. 2 showing an example fluid handling roll and an elongated fluid diversion element.

The fluid handling roll 204 and its various configurations will now be discussed in greater detail. Referring to FIG. 7, the fluid handling roll 204 may be positioned proximate to the first location 202 or downstream of the first location. The roll 204 may have a vacuum zone 212 and a blow-off zone 214. The vacuum zone 212 and the blow-off zone 214 do not necessarily have to be 50% of the roll each. In an instance, the roll 204 may have more than one vacuum zone 212 and more than one blow off zone 214. In other instances, the roll 204 may also have a single vacuum zone and the process fluid may be removed from the roll via a suction line, for example. Those of skill in the art will understand how to cycle vacuum and/or blow-off on and off. As an example in FIG. 7, the vacuum zone 212 is shown with process fluid going into the roll (by arrows) and the blow-off zone is shown with the process fluid going out of the roll (by arrows). The locations of the vacuum zone and the blow-off zone may stay the same as the roll rotates about its rotational axis 220. In such a fashion, the process fluid may be removed from proximate to the first location 202 and blown-off downstream of the first location 202 to reduce the need to remove a significant amount of the process fluid by vacuum under the moving porous member downstream. This allows for better continuous fiber crimping and loft on the moving porous member 134. The fluid handling roll 204 of FIG. 7 may optionally be used in combination with one or more elongated fluid diversion elements 206, such as one or more elongated conveyors, for example.

Figure 8:
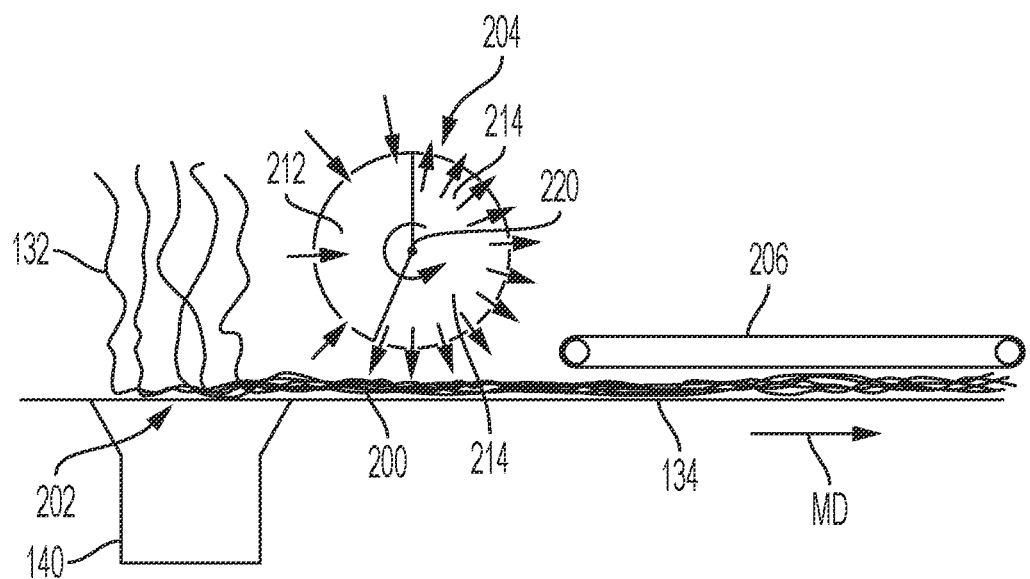
FIG. 8 is a plan view of a portion of the process illustration of FIG. 2 showing an example fluid handling roll and an elongated fluid diversion element.

FIG. 8 illustrates another fluid handling roll 204. This fluid handling roll 204 may be used to remove process fluid proximate to the first location 202, use the removed process fluid to create fiber entanglement that may function as pre-bonding in the intermediate continuous fiber nonwoven webs 200 on the moving porous member 134, and optionally, if process fluid is still available, blow-off the remainder of the process fluid. The pre-bonding would be a form of blowing-off the process fluid. This fluid may be heated prior to being blown-off. The fluid handling roll 204, instead of removing process fluid, may merely intake ambient air, heat it, and then apply pre-bonds to the web 200. In other instances, a heated fluid may be provided to the fluid handling roll 204 and the fluid handling roll 204 may apply pre-bonds to the web 200. In this instance, vacuum zones may not be provided. The fluid handling roll 204 of FIG. 8 may optionally be used in combination with the fluid diverter or remover or with one or more elongated fluid diversion elements 206, such as one or more elongated conveyors, for example.

Figure 9:
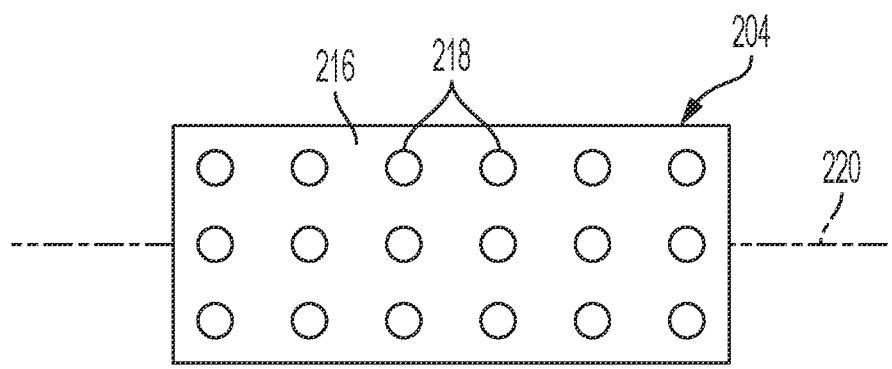
FIG. 9 is a plan view of the process fluid diverter or remover of FIGS. 7 and 8.

FIG. 9 is an example front view of the fluid handling roll 204 of FIGS. 7 and 8. The roll 204 may comprise an outer shell 216 and a plurality of fluid ports 218 defined in the outer shell. The fluid ports 218 may be in any suitable pattern as long as they are configured to pre-bond less than 100%, less than 75% (or other ranges specified herein) of the web 200. As the roll rotates about its rotational axis 220, positive and/or negative fluid pressure may be provided to the fluid ports 218 depending on which zone (vacuum/blow-off) those fluid ports are rotating through. In some instances, the roll 204 may only be used for blow-off pre-bonding when a heated fluid is supplied thereto.

Figure 10:
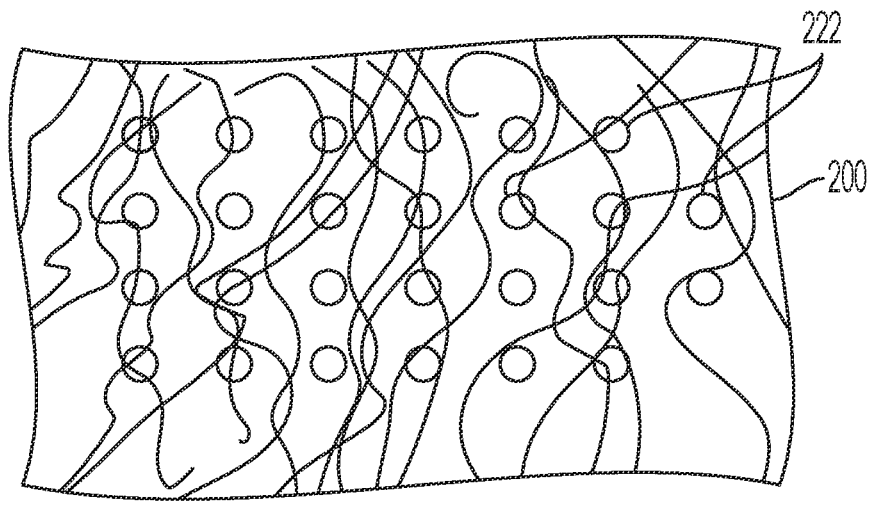
FIG. 10 is a top view of a portion of an intermediate continuous fiber nonwoven web comprising a plurality of pre-bonds.

The fluid ports 218 may be spaced a distance from each other in the machine direction (rotational direction of roll 204) and in the cross-machine direction. This allows blow-off that is intended for pre-bonding the web 200 to be intermittent in the machine direction and the cross-machine direction. As discussed, it is desired to pre-bond less than 100%, less than 75%, less than 50%, less than 25%, but all greater than 10% of the web 200. Pre-bonding less than an entire surface of the web 200 is desired to not lock or seal entire continuous fibers of the web and to provide the web with better air permeability so that fiber crimping and reorientation may occur downstream of the pre-bonding operation. Example pre-bonds 222 in a continuous fiber nonwoven web are illustrated in FIG. 10. The pre-bonds, however, may take on any suitable shape, pattern, configuration or density per unit area depending on the desired pre-bonding.

Figure 11:
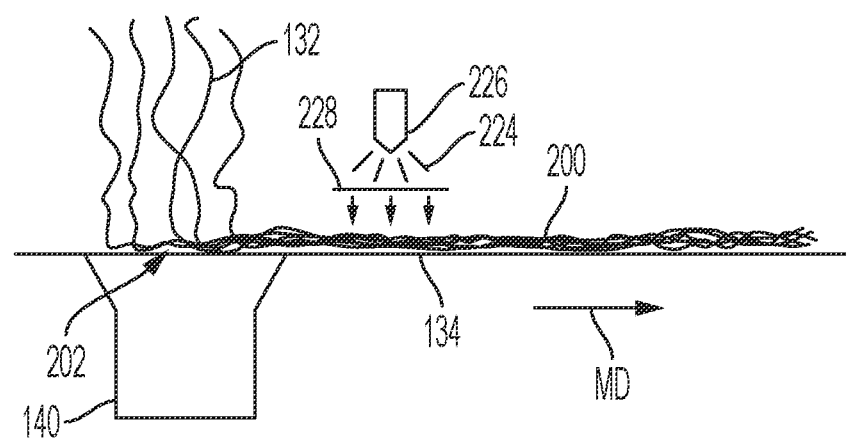
FIG. 11 is a plan view of a pre-bonding apparatus used to form pre-bonds in an intermediate continuous fiber nonwoven web.
Figure 12:
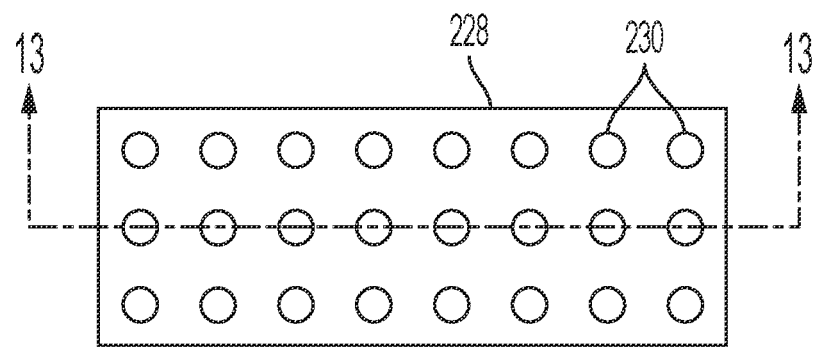
FIG. 12 is a bottom view of an example of the pre-bonding apparatus of FIG. 11 in the form of a perforated plate.
Figure 13:
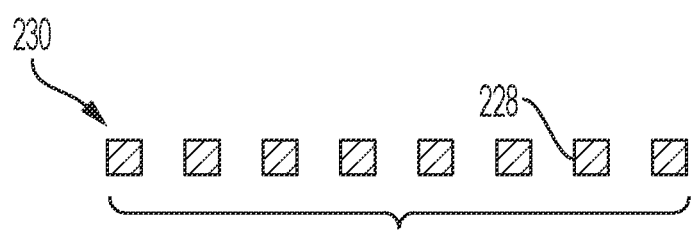
FIG. 13 is a cross-sectional view of the perforated plate of FIG. 12, taken about line 9-9 of FIG. 8.

The pre-bonds may also be created in the web 200 in other ways. In some instances, the pre-bonds may be formed by a heated fluid that is not the process fluid, but instead is a separate heated fluid provided to the process. Referring to FIG. 11, the fluid 224 may be emitted from a fluid nozzle 226 toward a perforated plate 228 having a plurality of fluid ports 230 or a perforated roll (like the roll illustrated in FIG. 9) to apply an intermittent or discontinuous pattern of pre-bonds to the web 200. Other configurations of fluid application to the web in a pre-bonding context are also within the scope of the present disclosure. The perforated plate and roll are just two examples. FIG. 12 illustrates a bottom view of the perforated plate 228 showing the plurality of fluid ports 230. FIG. 13 is a cross-sectional view of the perforated plate of FIG. 12, taken about line 13-13 of FIG. 12.

Any of the fluid handing roll 204, the fluid diverter 206, the process fluid remover/diverter 210, the perforated plate 228, and the water, steam, or other liquid being applied to the web may be used in combination. In some instances, less than all of the components or steps may be used together.

Methods

The methods of manufacturing soft and loft continuous fiber nonwoven webs are now discussed. A method of manufacturing a soft and lofty continuous fiber nonwoven web may comprise providing two or more molten polymer components having different melting temperatures to a spinneret defining a plurality of orifices, and flowing a fluid, such as air, intermediate the spinneret and a moving porous member or moving porous belt or screen. The moving porous member may be positioned below the spinneret. The bi-component continuous fiber strands may comprise polyethylene and polypropylene or may comprise polyethylene and polyethylene terephthalate. The different melting temperature of the two molten polymer components may be at least 5 degrees, at least 10 degrees C., but all less than 180 degrees C., including other ranges specified herein. The method may comprise aspirating the continuous fiber strands intermediate the spinneret and the moving porous member. Alternatively to the aspirating, the method may comprise passing the continuous fiber strands through a venturi intermediate the spinneret and the moving porous member. The method may comprise using the fluid to draw or push the two molten polymer components, in a direction that is toward the moving porous member, through at least some of the plurality of orifices to form a plurality of individual bi-component continuous fiber strands. The method may comprise depositing the continuous fiber strands on the moving porous member at a first location to produce an intermediate continuous fiber nonwoven web. The method may comprise first removing some of the fluid under the first location. The method may comprise second removing and/or diverting some of the fluid proximate to, but downstream of, the first location to maintain loft and softness in the deposited intermediate continuous fiber nonwoven web.

The method may comprise blowing-off the removed fluid downstream of the first location. The blowing-off step may comprise pre-bonding portions of the intermediate continuous fiber nonwoven web on the moving porous member and downstream of the first location.

The method may comprise providing a fluid handling roll proximate to the first location to accomplish the second removing step and the blowing-off step. The fluid handling roll may comprise an outer shell and a plurality of fluid ports defined in the outer shell. The method may comprise rotating the fluid handling roll about a rotational axis. The fluid handling roll may comprise a vacuum zone proximate to the first location and a blow-off zone downstream of the first location. More than one vacuum zone and more than one blow-off zone may be provided on a single fluid handling roll. The method may comprise creating a negative fluid pressure in the fluid ports in the vacuum zone to remove the fluid proximate to the first location and creating a positive fluid pressure in the fluid ports in the blow-off zone to blow-off the removed fluid downstream of the first location. The removed fluid may be used to intermittently pre-bond portions of the intermediate continuous fiber nonwoven web downstream of the first location. The moving porous member may comprise a porous screen or mesh. The method may comprise creating a negative fluid pressure in the moving porous member.

The method may comprise providing a perforated roll or perforated plate downstream of the first location and proximate to the intermediate continuous fiber nonwoven web and flowing a heated fluid, such as heated air, through the perforations to intermittently pre-bond portions of the continuous fibers of the intermediate continuous fiber nonwoven web together. The pre-bonds may be intermittent in a machine direction and a cross-machine direction.

The method may comprise third removing and/or diverting the fluid (i.e., process fluid) from the intermediate continuous fiber nonwoven web downstream of the first location. The method may comprise reducing vacuum forces applied to the intermediate continuous fiber nonwoven web during the third removing and/or diverting step the fluid step. The diverting step may comprise providing an elongated plate or an elongated conveyor belt extending in a general direction of the moving porous member, wherein the elongated plate or the elongated conveyer belt is positioned over at least a portion of the moving porous member. The elongated plate or the elongated conveyor may be angled with respect to a machine direction of the moving porous member in the range of about −40 degree to about 40 degrees, or other ranges specified herein. The elongated plate or the elongated conveyor may be spaced a distance in the range of 0.5 mm to about 15 mm, or other ranges specified herein, from the moving porous member. The method may comprise placing the elongated fluid diversion element a downstream machine directional distance in the range of about 0.1 to about 3 meters or about 0.1 meters to about 2 meters from a center of an impingement point (i.e., center of continuous fiber strands contacting the moving porous member 134 in the first location 202). It may be desired to place the elongated fluid diversion element as close to the fiber laydown stream or first location as possible without creating a disturbance in the fiber laydown.

The method may comprise conveying the intermediate continuous fiber nonwoven web through a through-fluid bonding oven to form a continuous fiber nonwoven web. The method may comprise reorienting the continuous fibers of the intermediate continuous fiber nonwoven web downstream of the first location. The method may comprise reorienting the continuous fibers of the intermediate continuous fiber nonwoven web downstream of the first location prior to the through-fluid bonding oven. The method may comprise allowing at least some of the continuous fibers of the intermediate continuous fiber nonwoven web to crimp on the moving porous member downstream of the first location.

A method of creating a soft and lofty continuous fiber nonwoven web may comprise providing two molten polymer components having different melting temperatures to a spinneret defining a plurality of orifices and flowing a fluid, such as air, intermediate the spinneret and a moving porous member. The moving porous member may be positioned below the spinneret. The method may comprise using the fluid to draw or push the two molten polymer components, in a direction that is toward the moving porous member, through at least some of the plurality of orifices to form a plurality of individual bi-component continuous fiber strands. The method may comprise depositing the continuous fiber strands on the moving porous member at a first location to form an intermediate continuous fiber nonwoven web, first removing some of the fluid under the first location, second removing and/or diverting some of the fluid proximate to, but downstream of, the first location to maintain loft and softness in the deposited intermediate continuous fiber nonwoven web, and pre-bonding less than 75%, or other ranges specified herein, of a non-porous moving member surface of the intermediate continuous fiber nonwoven web downstream of the first location.

The method may comprise allowing the continuous fibers of the intermediate fiber nonwoven web to crimp on the moving porous member downstream of the first location. The method may comprise third removing and/or diverting the fluid from the intermediate continuous fiber nonwoven web downstream of the first location. The method may comprise through-fluid bonding the intermediate continuous fiber nonwoven web to form a continuous fiber nonwoven web.

A method of creating a soft and lofty continuous fiber nonwoven web may comprise providing two molten polymer components having different melting temperatures to a spinneret defining a plurality of orifices and flowing a fluid intermediate the spinneret and a moving porous member. The moving porous member may be positioned below the spinneret. The method may comprise using the fluid to draw or push the two molten polymer components, in a direction that is toward the moving porous member, through at least some of the plurality of orifices to form a plurality of individual bi-component continuous fiber strands. The method may comprise depositing the continuous fiber strands on the moving porous member at a first location to form an intermediate continuous fiber nonwoven web, and pre-bonding less than 100%, or other ranges specified herein, of a non-porous moving member surface of the intermediate continuous fiber nonwoven web downstream of the first location. The method may comprise through-fluid bonding the intermediate continuous fiber nonwoven web to form a continuous fiber nonwoven web.

A method of creating a soft and lofty continuous fiber nonwoven web may comprise providing two molten polymer components having different melting temperatures to a spinneret defining a plurality of orifices and flowing a fluid intermediate the spinneret and a moving porous member. The moving porous member is positioned below the spinneret. The method may comprise using the fluid, mechanical mechanisms, or electrostatic mechanisms to draw or push the two molten polymer components, in a direction that is toward the moving porous member, through at least some of the plurality of orifices to form a plurality of individual bi-component continuous fiber strands. The method may comprise depositing the continuous fiber strands on the moving porous member at a first location to form an intermediate continuous fiber nonwoven web and applying a liquid and/or moisturized fluid 208 to a non-porous moving member surface of the intermediate continuous fiber nonwoven web downstream of the first location to reduce continuous fiber blow back. The method may comprise first removing some of the fluid under the first location, and second removing and/or diverting some of the fluid proximate to, but downstream of, the first location to maintain loft and softness in the deposited intermediate continuous fiber nonwoven web. The method may comprise third removing and/or diverting the fluid from the intermediate continuous fiber nonwoven web downstream of the first location. The method may comprise through-fluid bonding the intermediate continuous fiber nonwoven web to form a continuous fiber nonwoven web.

EXAMPLES/COMBINATIONS

A. A method of creating a soft and lofty continuous fiber nonwoven web, the method comprising:
  providing two molten polymer components having different melting temperatures to a spinneret defining a plurality of orifices;
  flowing a fluid intermediate the spinneret and a moving porous member, wherein the moving porous member is positioned below the spinneret;
  using the fluid to draw or push the two molten polymer components, in a direction that is toward the moving porous member, through at least some of the plurality of orifices to form a plurality of individual bi-component continuous fiber strands;
  depositing the continuous fiber strands on the moving porous member at a first location to form an intermediate continuous fiber nonwoven web;
  first removing some of the fluid under the first location;
  second removing and/or diverting some of the fluid proximate to, but downstream of, the first location to maintain loft and softness in the deposited intermediate continuous fiber nonwoven web; and
  pre-bonding less than 75% of a non-porous moving member surface of the intermediate continuous fiber nonwoven web downstream of the first location.
B. The method of Paragraph A, comprising allowing the continuous fibers of the intermediate fiber nonwoven web to crimp on the moving porous member downstream of the first location.
C. The method of Paragraph A or B, comprising third removing and/or diverting the fluid from the intermediate continuous fiber nonwoven web downstream of the first location.
D. The method of any one of Paragraphs A-C, comprising through-fluid bonding the intermediate continuous fiber nonwoven web to form a continuous fiber nonwoven web.
E. A method of creating a soft and lofty continuous fiber nonwoven web, the method comprising:
  providing two molten polymer components having different melting temperatures to a spinneret defining a plurality of orifices;
  flowing a fluid intermediate the spinneret and a moving porous member, wherein the moving porous member is positioned below the spinneret;
  using the fluid to draw or push the two molten polymer components, in a direction that is toward the moving porous member, through at least some of the plurality of orifices to form a plurality of individual bi-component continuous fiber strands;
  depositing the continuous fiber strands on the moving porous member at a first location to form an intermediate continuous fiber nonwoven web;
  pre-bonding less than 100% of a non-porous moving member surface of the intermediate continuous fiber nonwoven web downstream of the first location.
F. The method of Paragraph E, comprising through-fluid bonding the intermediate continuous fiber nonwoven web to form a continuous fiber nonwoven web.
G. A method of creating a soft and lofty continuous fiber nonwoven web, the method comprising:
  providing two molten polymer components having different melting temperatures to a spinneret defining a plurality of orifices;
  flowing a fluid intermediate the spinneret and a moving porous member, wherein the moving porous member is positioned below the spinneret;
  using the fluid to draw or push the two molten polymer components, in a direction that is toward the moving porous member, through at least some of the plurality of orifices to form a plurality of individual bi-component continuous fiber strands;
  depositing the continuous fiber strands on the moving porous member at a first location to form an intermediate continuous fiber nonwoven web;
  applying a liquid or moisturized fluid to a non-porous moving member surface of the intermediate continuous fiber nonwoven web downstream of the first location.
H. The method of Paragraph G, comprising:
  first removing some of the fluid under the first location; and
  second removing and/or diverting some of the fluid proximate to the first location to maintain loft and softness in the deposited intermediate continuous fiber nonwoven web.
I. The method of Paragraph H, comprising third removing and/or diverting the fluid from the intermediate continuous fiber nonwoven web downstream of the first location.
J. The method of any one of Paragraphs G-I, comprising through-fluid bonding the intermediate continuous fiber nonwoven web to form a continuous fiber nonwoven web.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any embodiment disclosed or claimed herein or that it alone, or in any combination with any other reference or references, teaches, suggests or discloses any such embodiment. Further, to the extent that any meaning or definition of a term in this document conflicts with any meaning or definition of the same term in a document incorporated by reference, the meaning or definition assigned to that term in this document shall govern.

While particular embodiments of the present disclosure have been illustrated and described, it would be obvious to those skilled in the art that various other changes and modifications may be made without departing from the spirit and scope of the present disclosure. It is therefore intended to cover in the appended claims all such changes and modifications that are within the scope of this disclosure.

What is claimed is:

1. A method of manufacturing a soft and lofty continuous fiber nonwoven web, the method comprising:
   providing molten polymer to a spinneret defining a plurality of orifices;
   flowing a fluid intermediate the spinneret and a moving porous member, wherein the moving porous member is positioned below the spinneret;
   using the fluid to draw or push the molten polymer, in a direction that is toward the moving porous member, through at least some of the plurality of orifices to form a plurality of individual continuous fiber strands;
   depositing the continuous fiber strands on the moving porous member at a first location to produce an intermediate continuous fiber nonwoven web;
   first removing some of the fluid under the first location;
   second removing and/or diverting some of the fluid proximate to, but downstream of, the first location in a direction that is away from the deposited intermediate continuous fiber nonwoven web to maintain loft and softness in the deposited intermediate continuous fiber nonwoven web;
   reorienting the continuous fibers of the intermediate continuous fiber nonwoven web downstream of the first location; and
   blowing-off the second removed and/or diverted fluid downstream of the first location.

2. The method of claim 1, wherein the blowing-off step comprises heating the fluid and pre-bonding portions of the intermediate continuous fiber nonwoven web on the moving porous member and downstream of the first location.

3. The method of claim 1, comprising:
   providing a fluid handling roll proximate to the first location to accomplish the removing step and the blowing-off step, the fluid handling roll comprising:
   an outer shell; and
   a plurality of fluid ports defined in the outer shell;
   rotating the fluid handling roll about a rotational axis;
   wherein the fluid handling roll comprises a vacuum zone proximate to the first location and a blow-off zone downstream of the first location;
   creating a negative fluid pressure in the fluid ports in the vacuum zone to remove the fluid proximate to the first location; and
   creating a positive fluid pressure in the fluid ports in the blow-off zone to blow-off the removed fluid downstream of the first location.

4. The method of claim 3, wherein the second removed fluid is used to intermittently pre-bond portions of the intermediate continuous fiber nonwoven web downstream of the first location.

5. The method of claim 1, wherein the moving porous member comprises a porous screen or mesh, the method comprising creating a negative fluid pressure in the moving porous member.

6. The method of claim 1, comprising:
   providing a perforated roll or perforated plate downstream of the first location and proximate to the intermediate continuous fiber nonwoven web; and
   flowing a heated fluid through the perforations to intermittently pre-bond portions of the continuous fibers of the intermediate continuous fiber nonwoven web together.

7. The method of claim 6, wherein the pre-bonds are intermittent in a machine direction and a cross-machine direction.

8. The method of claim 1, comprising:
   third removing and/or diverting the fluid from the intermediate continuous fiber nonwoven web downstream of the first location to shield the intermediate continuous fiber nonwoven web from surrounding fluids.

9. The method of claim 8, comprising:
   reducing vacuum forces applied to the intermediate continuous fiber nonwoven web during the third removing and/or diverting step.

10. The method of claim 8, wherein the diverting step comprises providing an elongated plate or an elongated conveyor extending in a general direction of the moving porous member, and wherein the elongated plate or the elongated conveyer is positioned over at least a portion of the moving porous member.

11. The method of claim 10, wherein the elongated plate or the elongated conveyor is angled with respect to a machine direction of the moving porous member in the range of about −40 degree to about 40 degrees, and wherein the elongated plate or the elongated conveyor is spaced a distance in the range of 0.5 mm to about 15 mm from the moving porous member.

12. The method of claim 1, comprising conveying the intermediate continuous fiber nonwoven web through a through-fluid bonding oven to form a continuous fiber nonwoven web.

13. The method of claim 1, wherein the moving porous member comprises at least one portion that is non-porous.

14. A method of manufacturing a soft and lofty continuous fiber nonwoven web, the method comprising:
   providing molten polymer to a spinneret defining a plurality of orifices;
   flowing a fluid intermediate the spinneret and a moving porous member, wherein the moving porous member is positioned below the spinneret;
   using the fluid to draw or push the molten polymer, in a direction that is toward the moving porous member, through at least some of the plurality of orifices to form a plurality of individual continuous fiber strands;
   depositing the continuous fiber strands on the moving porous member at a first location to produce an intermediate continuous fiber nonwoven web;
   first removing some of the fluid under the first location;
   second removing and/or diverting some of the fluid proximate to, but downstream of, the first location in a direction that is not toward the deposited intermediate continuous fiber nonwoven web to maintain loft and softness in the deposited intermediate continuous fiber nonwoven web;
   reorienting the continuous fibers of the intermediate continuous fiber nonwoven web downstream of the first location;
   conveying the intermediate continuous fiber nonwoven web through a through-fluid bonding oven to form a continuous fiber nonwoven web; and
   blowing-off the second removed and/or diverted fluid downstream of the first location.

15. The method of claim 14, wherein the blowing-off step comprises heating the fluid and pre-bonding portions of the intermediate continuous fiber nonwoven web on the moving porous member and downstream of the first location.

16. The method of claim 14, comprising:
providing a fluid handling roll proximate to the first location to accomplish the removing step and the blowing-off step, the fluid handling roll comprising:
an outer shell; and
a plurality of fluid ports defined in the outer shell;
rotating the fluid handling roll about a rotational axis;
wherein the fluid handling roll comprises a vacuum zone proximate to the first location and a blow-off zone downstream of the first location;
creating a negative fluid pressure in the fluid ports in the vacuum zone to remove the fluid proximate to the first location; and
creating a positive fluid pressure in the fluid ports in the blow-off zone to blow-off the removed fluid downstream of the first location.

17. The method of claim 16, wherein the second removed fluid is used to intermittently pre-bond portions of the intermediate continuous fiber nonwoven web downstream of the first location.

18. The method of claim 14, wherein the moving porous member comprises at least one portion that is non-porous.

* * * * *